(12) United States Patent
Sathe et al.

(10) Patent No.: US 12,321,769 B1
(45) Date of Patent: Jun. 3, 2025

(54) INCREMENTAL SNAPSHOTS OF STATE INFORMATION IN AN ON-DEMAND NETWORK CODE EXECUTION SYSTEM

(71) Applicant: Amazon Technologies, Inc., Seattle, WA (US)

(72) Inventors: Mihir Sathe, Seattle, WA (US); Newton Jain, Toronto (CA)

(73) Assignee: Amazon Technologies, Inc., Seattle, WA (US)

(\*) Notice: Subject to any disclaimer, the term of this patent is extended or adjusted under 35 U.S.C. 154(b) by 541 days.

(21) Appl. No.: 17/447,663

(22) Filed: Sep. 14, 2021

(51) Int. Cl.
*G06F 9/455* (2018.01)
*G06F 9/50* (2006.01)

(52) U.S. Cl.
CPC ........ *G06F 9/45558* (2013.01); *G06F 9/5022* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 8,782,365 | B1* | 7/2014 | Mooring | G06F 8/74 718/1 |
| 8,949,187 | B1* | 2/2015 | Satish | G06F 11/1461 707/649 |
| 9,021,008 | B1* | 4/2015 | Andrus | H04L 43/50 717/124 |
| 9,110,600 | B1* | 8/2015 | Brooker | G06F 3/0614 |
| 9,189,495 | B1* | 11/2015 | Hughes | G06F 16/1844 |
| 9,361,162 | B1* | 6/2016 | Higgins | G06F 9/455 |
| 9,720,806 | B1* | 8/2017 | Baars | G06F 11/3604 |
| 9,830,345 | B1* | 11/2017 | Baars | G06F 16/2246 |
| 10,061,613 | B1* | 8/2018 | Brooker | G06F 9/5005 |
| 10,108,446 | B1* | 10/2018 | Steinberg | G06F 12/109 |
| 10,713,080 | B1* | 7/2020 | Brooker | G06F 9/45558 |
| 10,776,091 | B1* | 9/2020 | Wagner | G06F 9/45558 |
| 10,901,728 | B1* | 1/2021 | Negoshian | G06F 8/71 |
| 10,963,479 | B1* | 3/2021 | Shah | G06F 16/254 |
| 11,042,503 | B1* | 6/2021 | Vig | G06F 11/1451 |
| 11,099,870 | B1* | 8/2021 | Brooker | G06F 11/1484 |
| 11,119,809 | B1* | 9/2021 | Brooker | G06F 9/466 |
| 11,277,494 | B1* | 3/2022 | McPherson | H04L 67/01 |
| 11,487,538 | B1* | 11/2022 | Gove, Jr. | G06F 8/77 |

(Continued)

*Primary Examiner* — Adam Lee
(74) *Attorney, Agent, or Firm* — Knobbe, Martens, Olson & Bear, LLP

(57) ABSTRACT

Systems and methods are described for stateful execution of code modules in an on-demand network code execution system. A user may provide a code module for execution on the system by submitting a code module. The code module may reference previously generated state information, such as a state of components of the execution environment. The system may obtain a snapshot of the state information for execution of the code module. Based on the code module referencing the state information, a virtual machine instance with the execution environment may be initialized based on the state information. The system may generate incremental snapshots or otherwise capture information regarding the state of the components of the virtual machine instance based on executing the code module. The system may then store the snapshots for loading for additional code modules.

22 Claims, 5 Drawing Sheets

(56) References Cited

U.S. PATENT DOCUMENTS

| | | | |
|---|---|---|---|
| 12,007,943 B2* | 6/2024 | Ramachandran | G06F 16/128 |
| 2003/0093431 A1* | 5/2003 | Cooke | G06F 16/273 |
| 2003/0101321 A1* | 5/2003 | Ohran | G06F 11/1451 |
| | | | 714/E11.123 |
| 2003/0158861 A1* | 8/2003 | Sawdon | G06F 11/2097 |
| 2006/0101455 A1* | 5/2006 | Mantani | G06F 8/65 |
| | | | 717/168 |
| 2006/0184828 A1* | 8/2006 | Wynn | G06F 9/4418 |
| | | | 714/38.14 |
| 2009/0150872 A1* | 6/2009 | Russell | G06F 8/656 |
| | | | 717/140 |
| 2012/0209812 A1* | 8/2012 | Bezbaruah | G06F 11/1484 |
| | | | 707/646 |
| 2013/0139128 A1* | 5/2013 | Jones | G06F 11/3664 |
| | | | 717/128 |
| 2013/0283160 A1* | 10/2013 | Ball | H04L 65/103 |
| | | | 709/219 |
| 2014/0040888 A1* | 2/2014 | Bookman | G06F 9/485 |
| | | | 718/1 |
| 2014/0196052 A1* | 7/2014 | Arai | G06F 9/5083 |
| | | | 718/104 |
| 2015/0095885 A1* | 4/2015 | Louvau | G06F 16/2228 |
| | | | 717/120 |
| 2015/0169431 A1* | 6/2015 | Ivankovic | G06F 11/3676 |
| | | | 717/124 |
| 2015/0309829 A1* | 10/2015 | Hiltgen | G06F 21/53 |
| | | | 718/1 |
| 2016/0110268 A1* | 4/2016 | Sekiguchi | G06F 11/1456 |
| | | | 714/15 |
| 2016/0364440 A1* | 12/2016 | Lee | G06F 11/1471 |
| 2017/0085636 A1* | 3/2017 | Lin | H04L 67/1008 |
| 2017/0244593 A1* | 8/2017 | Rangasamy | H04L 67/1097 |
| 2018/0011895 A1* | 1/2018 | Johnson | G06F 16/27 |
| 2018/0203996 A1* | 7/2018 | Gathala | G06F 11/3079 |
| 2019/0155699 A1* | 5/2019 | Luo | G06F 11/1451 |
| 2019/0332267 A1* | 10/2019 | Muniswamy-Reddy | |
| | | | G06F 3/065 |
| 2019/0340109 A1* | 11/2019 | Barron-Kraus | G06F 8/65 |
| 2020/0012619 A1* | 1/2020 | Gupta | G06F 16/9027 |
| 2020/0257615 A1* | 8/2020 | Richardson | G06F 3/0484 |
| 2021/0117385 A1* | 4/2021 | Haldar | G06F 11/1448 |
| 2021/0120039 A1* | 4/2021 | Bett | G06F 11/1461 |
| 2021/0240509 A1* | 8/2021 | Brooker | G06F 9/45558 |
| 2021/0357297 A1* | 11/2021 | Kochar | G06F 11/1451 |
| 2021/0382809 A1* | 12/2021 | Lyman | G06F 11/3688 |
| 2022/0019462 A1* | 1/2022 | Nishiguchi | G06F 9/4881 |
| 2022/0138048 A1* | 5/2022 | Yelheri | G06F 3/0667 |
| | | | 707/649 |
| 2022/0317987 A1* | 10/2022 | Scrivano | G06F 16/196 |

* cited by examiner

INCREMENTAL SNAPSHOTS OF STATE INFORMATION IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

Virtual machines can be provisioned with multiple components of resources. For example, virtual machines can be provisioned with memory, a disk, a graphical processing unit, etc. Based on the resources provisioned for the virtual machine, a user may configure the virtual machine to implement desired functionality (e.g., to conduct computations). Specifically, users can provide a plurality of code for execution using the provisioned resources. Execution of the plurality of code may cause changes to the state of the provisioned resources. For example, execution of the code may modify provisioned memory for the virtual machine. Due to the virtualized and/or dynamic nature of the virtual machines, the changes to the state may not be maintained for use in executing additional code.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
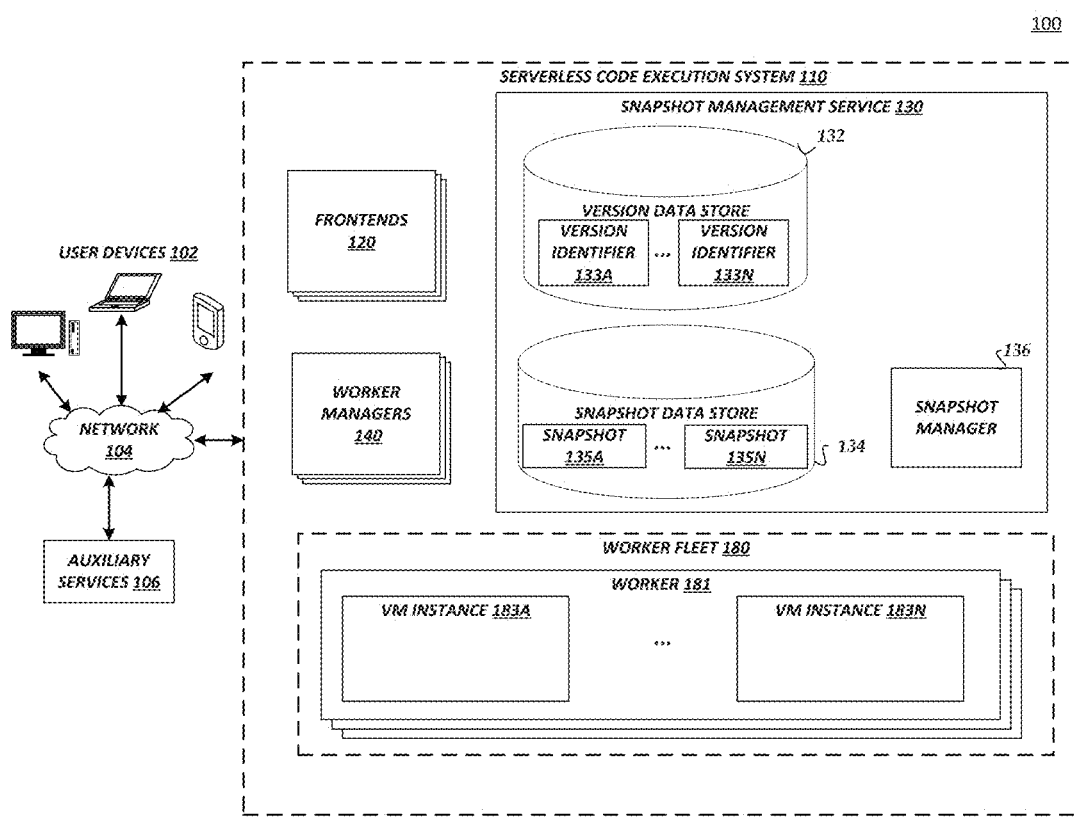
FIG. 1 is a block diagram depicting an illustrative environment in which an on-demand code execution system can execute code modules and can identify state information for the code modules.

Generally described, aspects of the present disclosure relate to the execution of a code module based on a "snapshot" of state information of components for execution of the code module in an on-demand code execution system. The on-demand code execution system enables rapid execution of code modules, which may be supplied by users of the on-demand code execution system. More specifically, embodiments of the present disclosure relate to improving the performance of an on-demand code execution system that is implemented using various computing resources. As described in detail herein, the on-demand code execution system may provide a network-accessible service enabling users to submit or designate computer-executable code (threads, programs, etc., composed in any of a variety of programming languages) to be executed by virtual machine instances on the on-demand code execution system. Users may submit the code module as a notebook cell or a code cell. For example, a user may define a code cell of a notebook where the code cell (or notebook cell) includes one or more statements in a programming language. Each code module may define a set of code for execution. The set of code may include any code that requires additional data (e.g., state information) for execution of the code. Each set of code may also include code associated with a plurality of code classes, a plurality of code functions, a plurality of code languages, or a plurality of code identifiers. Further, each code module on the on-demand code execution system may define a "task" to execute the set of code and implement specific functionality corresponding to that task when executed on a virtual machine instance of the on demand code execution system. For example, a user may submit a script in a specific programming language (e.g., the PYTHON™ language) that, when executed, implements network-based processing for a user-facing application (e.g., a mobile device "app"). Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may thus allow users to execute code in a serverless environment (e.g., one in which the underlying server is not under user control). The serverless environment then enable the user to submit "calls" to execute that script, at which point the system will securely execute the script to provide the desired functionality. Unlike some other network-based services, a serverless environment can remove the need for a user to maintain or configure a computing device, either virtual or physical, to support code execution. It is this lack of need for a user to maintain a device that leads to the "serverless" moniker, though of course the serverless environment itself, as opposed to individual users, likely maintains servers to support code execution. Serverless environments can be particularly well suited for processes with varying demand, as the serverless environments can rapidly scale up and down the computing resources used to service such processes. In comparison to traditional systems using dedicated servers (physical or virtual), serverless environments often provide much higher efficiency with respect to computing resources used. The serverless environment may enable the stateless execution of code modules. The on-demand code execution system may dynamically spin up virtual machine instances based on receiving a request to implement a code module. The on-demand code execution system may utilize the virtual machine instance to execute the code module. During execution of the code module, the virtual machine instance may generate state information based on executing the code module. For example, the state information may identify (e.g., indicate) the modification of a modified state of components (e.g., memory, a disk, a graphical processing unit) of the virtual machine instance where the state of the components is modified due to the execution of the code module. However, after executing the code module, the on-demand code execution system may tear down (e.g., release) the virtual machine instance and release the state information. Therefore, the state information from the execution of the code module may not be retained for the execution of subsequent code modules. Instead, the on-demand code execution system may statelessly execute each code module.

As noted above, one issue that may be of particular concern in serverless environments is that of stateful execution of code as users may wish to retain state information generated from the execution of a code module. For example, the execution of a code module may cause the state of components of the virtual machine instances to be modified (e.g., the state information is changed). As the code module is executed in an on-demand code execution system, the modified state may not be retained. A user may wish to retain this modified state in order to perform further operations. Further, the state information generated as a result of the execution of the code module may contain important information that the user may desire to retain for further operations or the user may desire to execute additional code modules based on the previously generated or modified state information (e.g., the user may desire to undo the changes to the state information, redo the changes, fork the state information, merge the state information, select information from the state information, etc.). Therefore, the stateless execution of the code modules can lead to inadequate user experiences as the user may be unable to iteratively execute code modules against saved state information and can lead inaccurate results. Instead, each code module may be executed in view of particular base state information (e.g., no state information) and any state information generated by the execution of a code module may be released upon release of the virtual machine instance.

Further, the execution of a code module using serverless computing may be unable to guarantee routing of the code module to any particular serverless environment. For example, two calls to execute a code module may go to different serverless environments. Therefore, if the state information is retained for a particular code module executed in a first serverless environment, the execution of another code module may occur in a second serverless environment that does not have access to the state information. Instead, each code module may be executed in different serverless environments that may not have access to the previously generated state information. Further, while traditional snapshotting may enable the state of an executing machine to be paused and resumed, the state information is paused and may be tied to a particular module. Therefore, the state information may be coupled to a particular code module and may not be forked, versioned, etc.

In some embodiments, a user may utilize web applications that allow users to create and share live code for deployment (e.g., code modules). The code may be implemented and deployed via a "notebook." Notebooks let users provide new code modules for execution against previously generated state information. Such notebooks include a plurality of code modules or code cells. The code cells may each incrementally change state information of an execution environment (e.g., memory, disks, graphical processing units ("GPUs"), etc.). The code cells of the notebooks may be implemented using hosted hardware. For example, one or more compute instances and one or more containers. However, the use of hosted hardware may be inefficient. For example, the request rate to the hosted hardware may be slow and inefficient. Further, the cost associated with paying for and maintaining the hosted hardware may be extensive. Further still, while the state information generated by code cells may be retained, a user may be unable to undo or redo the modifications to the state information caused by the execution of the code cells. Instead, while the execution of the code cells may be undone and redone, the modifications to the state information may not be redone or undone. Further, while the execution system may retain the state information, the execution system may not retain different versions or iterations of the state information. This can lead to an inadequate performance and is generally detrimental to the goal of enabling users to dynamically manage the state information generated by the execution of code cells.

Embodiments of the present disclosure address these problems by enabling an on-demand code execution system to incrementally "snapshot" state information of components of the virtual machine, the state information capturing modifications to the state of the components caused by the execution of code modules. Such an incremental snapshot of the state information retains the advantages offered by the use of notebooks by enabling users to provide code modules for execution against previously generated state information while retaining the advantages of an on-demand code execution system. Further, the incremental snapshotting can reduce or eliminate performance issues, due, for example, to a lack of saved state information for use in execution of multiple code modules. More specifically, embodiments of the present disclosure enable the incremental snapshot of state information generated by the execution of a code module by a virtual machine instance, prior to the on-demand code execution system tearing down the virtual machine instance. Further, the incremental snapshot of the state information may be retained after the virtual machine instance is torn down. This can enable the state information to be utilized for the execution of additional code modules. Further, the code modules may be implemented in a serverless environment while achieving increased functionality, thereby maintaining the benefit offered by the execution of the code module using virtual resources and maintaining the benefit of saved state information. By capturing the incremental snapshots of state information, the particular code module associated with the state information may be decoupled from the state information. Therefore, multiple code modules may be used to transform or manipulate the state information in different ways (e.g., the state information can be versioned or forked, changes to the state information can be undone or redone, etc.) Thus, the on-demand code execution system may incrementally snapshot state information generated or modified by the execution of code modules.

Further, by snapshotting the state information, statefulness can be retained in serverless execution of code modules. The snapshots of the state information capture the state information without requiring execution of the code modules in a stable environment. While traditional cloud computing environments may utilize stable environments to execute code modules, the incremental snapshot of the state information enables state information to be retained in a serverless execution of code modules. Further, the state information may be decoupled from a specific code module. Thus, the state information can be utilized across multiple code modules executed in separate serverless environments. In order to retain the statefulness, each request to execute a code module can be accompanied with an identifier of a snapshot (e.g., a pointer to a snapshot). The snapshot may represent state information that the code module should use for execution. The request for execution of the code module can be satisfied by provisioning an execution environment with a snapshot holding the state information, and executing the code in the provisioned environment. Therefore, requests for execution may be directly tied to specific state information, relieving a need to separately configure an environment with state information prior to executing a code module in that environment. Thus, the end user experience may be simplified (as only a single request may be required) and a serverless compute system may maintain the ability to distribute requests according to internal load balancing, rather than to any particular environment. Moreover, by decoupling code modules from specific state information, an end user may be enabled to "mix and match" code and state according to their requirements. For example, each request to execute a code module may specify particular state information to be provisioned into an execution environment for the code module, which particular state information may have been generated by execution of a prior code module. In this manner, state information can be passed between code modules, without requiring the state information itself to be passed in a call to invoke the code module, and without strongly coupling all executions of a code module to particular state information.

Each virtual machine instance of the on-demand code execution system may be associated with state information. For example, the state information may identify a state of one or more components (e.g., memory, disks, GPUs, etc.) of the virtual machine instance. The on-demand code execution system may execute a plurality of code modules. The execution of each code module may modify the state of the one or more components of the virtual machine instance executing the particular code module. For example, the execution of a particular code module may modify memory of a particular virtual machine instance used for the execution of the code module. Based on the execution of the code module, the on-demand code execution system can "snapshot" the state of the one or more components to generate a snapshot of the state information. The on-demand code execution system may then release the virtual machine instance and the one or more components of the virtual machine instance. Further, the on-demand code execution system may incrementally snapshot the state of the one or more components to generate incremental or versioned snapshots of the state information. For example, the on-demand code execution system may generate incremental snapshots that identify differences between first state information and second state information. Therefore, the incremental snapshots may store a minimum amount of data to identify differences, or a delta, between first state information and second state information and may not identify the full second state information. The incremental or versioned snapshots may be stored as chunks of state information. Thus, the state information generated by the execution of code modules may be stored as chunks for execution of additional code modules.

As described below, to utilize the snapshot of the state information, a code module may be executed based on the snapshot of the state information. The chunks of the state information may be "lazily" loaded into an execution environment, by quickly providing a minimum portion of the state information needed to begin execution of code, and providing additional portions of the state information on-demand for the code execution. For example, the minimum portion of the state information may identify the differences between base state information (e.g., original state information) and updated state information (e.g., state information modified by execution of a code module). More specifically, a request to execute a code module may be satisfied by provisioning an execution environment with access to a snapshot of state information, without actually transferring the entire state information to a local storage drive for the environment. Instead, the state information may be made available via a file system that operates to selectively retrieve portions of the state information as they are read by the code execution. For example, a host computing device that is hosting an execution environment may be configured to provide a Filesystem in User Space (FUSE) storage device that—from the view of the execution environment—contains the state information. On reads to the FUSE storage device, a local FUSE agent may selectively retrieve any required portions of the state information and make the read portion of the state information available on the FUSE storage device. Thus, from the point of view of the execution environment, complete local access to the state information is provided. However, because the state information is "lazily" loaded, code execution can begin before the entire state information is transferred to the execution environment. Indeed, if the environment never requires access to a portion of the state information, that portion need never be transferred to the environment. As such, the latency to execute code is reduced. Various embodiments for loading the state information are described in more detail in U.S. patent application Ser. No. 17/105,250, entitled "LOW LATENCY ACCESS TO DATA SETS USING SHARED DATA SET PORTIONS," and filed Nov. 25, 2020 (the "250 Patent Application"), the entirety of which is hereby incorporated by reference.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

As will be appreciated by one of skill in the art in light of the present disclosure, the embodiments disclosed herein improve the ability of computing systems, such as on-demand code execution systems, to retain state information generated or modified based on the execution of a code module. Moreover, the presently disclosed embodiments address technical problems inherent within computing systems; specifically, the difficulties of retaining state information for an on-demand code execution environment. These technical problems are addressed by the various technical solutions described herein, including incrementally snapshotting the state information generated by the execution of code modules and executing additional code modules based on the incremental snapshots. Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a serverless code execution system 110 via a network 104. By way of illustration, various example client devices 102 are shown in communication with the serverless code execution system 110 (the on-demand code execution system), including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programing interfaces (API), and/or other programmatic interfaces for generating and uploading user-executable source code (e.g., as part of a disk image or in association with a data set depended on by the code), invoking the user-provided source code (e.g., submitting a request to execute the source code on the serverless code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution system 110 or otherwise communicate to the serverless code execution system 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks (not shown in FIG. 1). The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted, or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users, by way of user computing devices 102, may interact with the serverless code execution system 110 to provide source code, and establish rules or logic defining when and how such code should be executed on the serverless code execution system 110, thus establishing a "task." For example, a user may wish to run a set or piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc.) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the on-demand code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may define subject code for the task and associated data to be used to execute the task. In one embodiment, the code is provided in the form of a disk image containing the code and other data that the code may use during execution. The disk image and associated metadata for the task (e.g., the end user who "owns" the task or other information regarding the task) may be stored within an object storage system. The object storage system may represent any of a number of object storage systems, such as AMAZON™'s SIMPLE STORAGE SERVICE™ (or "S3™"). In accordance with embodiments of the present disclosure, a disk image may further be divided into a number of portions, each stored as a separate object on the object storage system.

After a user has created a task on the serverless code execution system 110, the system 110 may accept calls to execute that task. To accept calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the serverless code execution system 110 may desire to limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). Alternatively or additionally, tasks may be triggered for execution at the serverless code execution system 110 based on data retrieved from one or more auxiliary services 106. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further include an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A, . . . , 183N. As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed of performance of virtual machine instances. Other techniques that allow direct utilization of underlying hardware, such as hardware pass-through techniques, may be used as well. Execution environments may alternatively include software containers, sometimes referred to as "OS-level virtualization," another virtualization technology known in the art. Thus, where references are made herein to VM instances 183A, . . . , 183N, it should be understood that (unless indication is made to the contrary) a container may be substituted for such instances 183A, . . . , 183N.

Each worker 181 may host a number of instances 183A, . . . , 183N. Each of the instances 183A, . . . , 183N may be isolated from other instances 183A, . . . , 183N, thus ensuring the security of code executions on the serverless code execution system 110. For example, each of the instances 183A, . . . , 183N may be divided by a virtualization boundary, by virtue of the instances 183A, . . . , 183N being a virtual machine hosted by the worker 181. In addition, each of the instances 183A, . . . , 183N may exist within a partitioned user space on the worker 181, which logically partitions resources of the worker 181 among the instances 183A, . . . , 183N. Each user space may, for example, represent a "chroot" jail-a known isolation technique for LINUX™ operating systems. Each virtual machine instance may be instantiated with one or more virtualized physical components that are supported by physical components of the host device (e.g., memory, disks, GPUs, etc.). For example, the VM instance 183A may be instantiated with particular virtualized physical components. Each of the instances 183A, . . . , 183N may be dynamically spun up or down based on requests for execution of code modules (e.g., provisioned or released).

To facilitate rapid execution of code, each worker 181 may be configured to maintain a set of instances 183A, . . . , 183N in a "pre-warmed" state, being at least partially configured to begin execution of code. For example, instances may be created on the worker and configured with access to virtualized physical components. In accordance with embodiments of the present disclosure, it may be impractical or impossible to maintain instances 183A, ..., 183N in a fully warmed state for all possible code executions, as executions may be associated with a wide variety of at least partially distinct data sets (e.g., disk images and/or snapshots). Thus, instances 183A, ..., 183N may be maintained in a "greatest commonality" for a given group of tasks, such as being provisioned with a set of computing resources common to those tasks, being configured to accept an operating system type used by those tasks, etc.

On receiving instructions to provision an instance 183A to support execution of the task, the worker 181 may adjust the configuration of the instance 183A to support that execution. Specifically, and in accordance with embodiments disclosed herein, the worker 181 may provision the instance 183A with access to a disk image or snapshot corresponding to the task, in a manner that does not require that disk image or snapshot to be fully transferred to local storage of the worker 181 prior to use. Rather, the worker 181 may provide to an instance 183A what appears to be full local access to the disk image or snapshot, while "lazily" retrieving portions of that image or snapshot in response to a request to read such portions. Further, the worker 181 may also provision the instance 183A with access to snapshot of state information by lazily loading the snapshot of the state information. Thus, the worker 181 can provision the instance 183A by lazily loading the disk image and the snapshot of the state information.

The serverless code execution system 110 may load the snapshot of the state information from the snapshot management service 130. The snapshot management service 130 may incrementally or periodically snapshot the state information and store the incremental snapshots or versioned snapshots 135A, ..., 135N of the state information generated by execution of code modules. The snapshot management service 130 may store the snapshots 135A, ..., 135N in the snapshot data store 134. Further, the snapshot management service 130 may store version identifiers 133A, ..., 133N identifying the version of each snapshot in a version data store 132. The snapshot management service 130 may also include a snapshot manager 136 that may store the version identifiers 133A, ..., 133N and snapshots 135A, ..., 135N and may identify a particular version identifier and a particular snapshot to the worker 181 in response to a received code module. The snapshot manager 136 may provide the requested incremental snapshots 135A, ..., 135N to the worker 181 in response to a request to execute a code module. For example, the serverless code execution system 110 may receive a request from the user device 102 to execute a code module. The serverless code execution system 110 may also receive a state information request from the user device 102 for execution of the code module. The serverless code execution system 110 may receive the state information request, and, based on the state information request, the snapshot manager 136 may identify a version identifier corresponding to the state information request. Further, the snapshot manager 136 can identify a particular incremental snapshot corresponding to the version identifier for execution of the code module. The snapshot management service 130 can provide the incremental snapshot to the worker 181 for execution of the code module.

In addition, the system 110 includes a number of components for facilitating distribution of calls to execute a task from frontends 120 to particular VM instances 183A, ..., 183N. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices— illustratively "lease" particular VM instances 183A, ..., 183N within the fleet 180, thus gaining operational control to, for example, instruct virtual machine instances 183A, ..., 183N to execute code of the task. Thus, on receiving a call to execute a task, a frontend 120 may distribute the call to a worker manager 140, which may identify a currently-leased VM instance 183A in which to implement the task, and cause the instance 183A to implement the task. Example interactions for distributing a call from a frontend 120 to a worker manager 140 are described, for example, in U.S. patent application Ser. No. 16/698,829, entitled "SERVERLESS CALL DISTRIBUTION TO UTILIZE RESERVED CAPACITY WITHOUT INHIBITING SCALING" and filed Nov. 27, 2019, the entirety of which is hereby incorporated by reference.

In accordance with embodiments of the present disclosure, the snapshot management system 130 may store snapshots 135A, ..., 135N in a snapshot data store 134 for use in execution of a code module. Further, the snapshot management system 130 may store version identifiers 133A, ..., 133N identifying the snapshots 135A, ..., 135N in a version data store 132. The version identifiers 133A, ..., 133N and the snapshots 135A, ..., 135N may be managed and stored by a snapshot manager 136.

Figure 2:
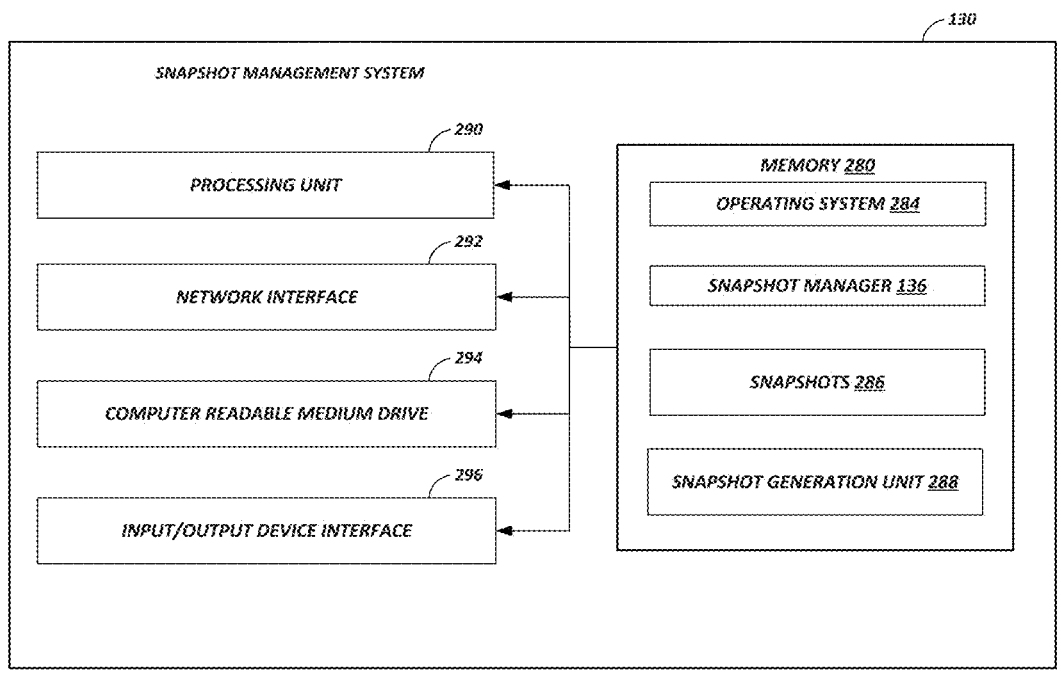
FIG. 2 depicts a general architecture of a computing device providing a snapshot management system that is configured to manage snapshots of state information in the on-demand code execution system of FIG. 1.

FIG. 2 depicts a general architecture of a computing system (referenced as snapshot management system 130) that operates to identify a particular incremental snapshot of state information for the execution of a particular code module within the serverless code execution system 110. The general architecture of the snapshot management system 130 depicted in FIG. 2 includes an arrangement of computer hardware and software modules that may be used to implement aspects of the present disclosure. The hardware modules may be implemented with physical electronic devices. The snapshot management system 130 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the device 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) RAM, 3D XPOINT memory, flash memory, magnetic storage, and the like. For example, primary memory may be assumed for the purposes of description to represent a main working memory of the device 200, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes a snapshot manager 136 to manage the incremental snapshots as described above. The memory 280 also includes a snapshot generation unit 288 for generation of the snapshots. In some embodiments, the snapshot manager 136 may include the snapshot generation unit 288. In addition, the memory 280 includes the snapshots 286 of state information. The snapshots 286 may be cached locally to the device 200, such as in the form of a memory mapped file.

The snapshot management system 130 of FIG. 2 is one illustrative configuration of such a device, of which others are possible. For example, while shown as a single device, a snapshot management system 130 may in some embodiments be implemented as a logical device hosted by multiple physical host devices. In other embodiments, the snapshot management system 130 may be implemented as one or more virtual devices executing on a physical computing device. While described in FIG. 2 as a snapshot management system 130, similar components may be utilized in some embodiments to implement other devices shown in the environment 100 of FIG. 1.

Figure 3:
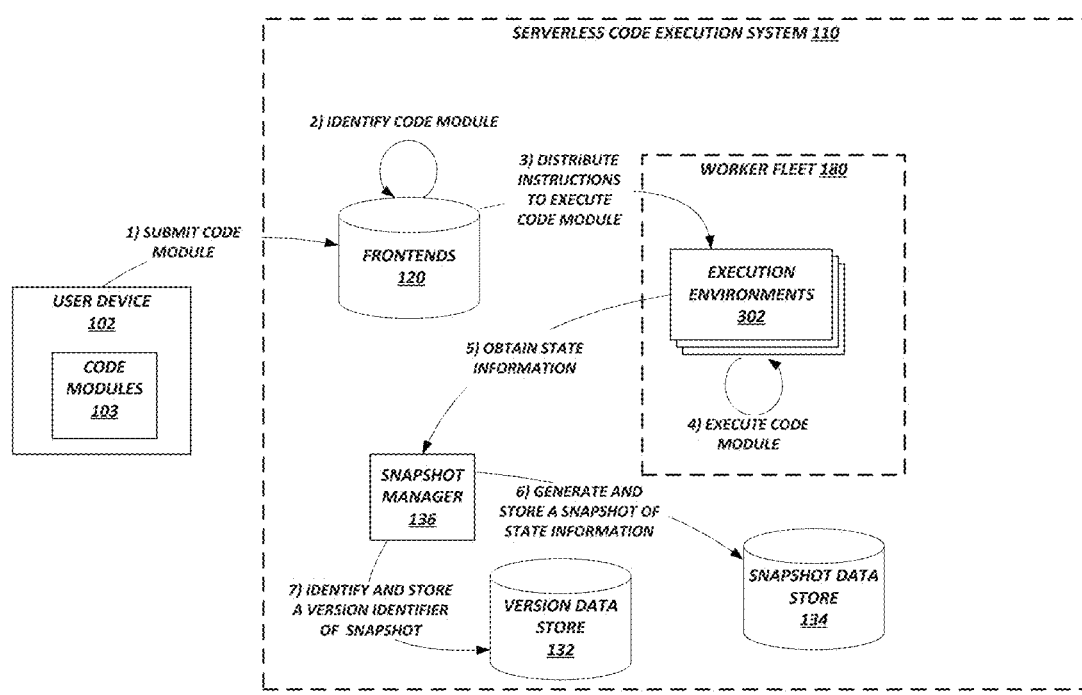
FIG. 3 is a flow diagram depicting illustrative interactions for executing a code module and storing a snapshot of state information based on the execution.

To further illustrate how the state information is modified or generated by the execution of a code module using a virtual machine instance, FIG. 3 depicts illustrative interactions for executing a code module using the serverless code execution system 110, including provisioning a virtual machine instance and snapshotting the state information generated or modified by the execution of the code module. The interactions of FIG. 3 may occur, for example, after additional code modules have been provided to the serverless code execution system 110 for execution and after the generation of one or more snapshots of state information modified by the execution of the code modules. Further, the interactions may begin prior to the generation of snapshots of state information and/or prior to the execution of additional code modules.

The interactions of FIG. 3 begin at (1), where a user device 102 submits a code module 103 (e.g., a set of code and a stateful information request) to the frontend 120 to execute the code module. The user device 102 may submit the code module 103 to the frontend 120 as a call to the frontend 120 to execute a task (e.g., the task of executing the code module). The user device 102 may edit the code module 103 and invoke the code module 103 via the serverless code execution system 110. The serverless code execution system 110 may be a bifurcated deployment system that provisions remote resources to invoke the code module and releases the remote resources after invoking the code module. The user device 102 may utilize an interface (e.g., a web browser, a notebook client interface) to define and invoke the code modules 103. Further, the user device 102 may store multiple code modules. Each code module may include a plurality of code (e.g., one or more lines of code) that, when executed, incrementally change (e.g., modify) state information of components of the execution environment. For example, if a virtual machine instance executes a particular code module, the execution of the code module may result in the modification of components of the virtual machine instance (e.g., memory, disks, GPUs, etc.). Each modification of the components may result in the generation or modification of state information identifying the modifications or changes in state of the components. For example, the state information may identify a current state of memory based on the execution of a code module 103. In some embodiments, the user device 102 may submit the code module 103 to a remote instance hosting and running a notebook kernel which can act as a pass through to route the code module 103 to the frontend 120 of the serverless code execution system 110. Access to the frontend 120 may be restricted to a particular group of users and therefore, one of the remote instance or the frontend 120 may verify that the user is a verified or authorized user. In other embodiments, the user device 102 may submit the code module 103 to the frontend 120. Therefore, the user device 102 may submit a code module 103 to the frontend 120 to execute the code module 103.

Submission of the code module 103 to the frontend 130 may include transmission of specialized data to the frontend 120, such as a HTTP packet or API call referencing the code module 103 and/or the task to execute the code module 103. While the interactions of FIG. 3 are described as submitting an explicit request, by the user device 102, to execute the code module, requests to execute the code module may occur in a variety of manners, including submission of a call by auxiliary services 106 (not shown in FIG. 3). The request may include any information required to execute the code module 103, such as parameters for execution, authentication information under which to execute the code module 103 or to be used during execution of the code module, etc.

To determine how to execute the code module 103, the serverless code execution system 110, at (2), identifies the code module 103. The serverless code execution system 110 may identify the code module 103 from the received request from the user device 102. The serverless code execution system 110 may also determine whether the request includes a stateful information request (e.g., a request for stateful execution of the code module). If the serverless code execution system 110 determines that the request includes a stateful information request, the serverless code execution system 110 may identify a version identifier corresponding to the stateful information request (e.g., a pointer to the state information). Based on the version identifier, the serverless code execution system 110 may identify a snapshot linked to the version identifier. In the example of FIG. 3, the serverless code execution system 110 may determine that the request does not include a stateful information request. Therefore, the serverless code execution system 110 may identify the code module 103 from the request from the user device 102.

To provide the code module 103 to a particular virtual machine instance, the frontend 120, at (3), distributes instructions to execute the code module 103 to the worker fleet 180. In order to distribute the code module to the worker fleet 180, the frontend 120 can distribute the code module 103 to a worker manager of the worker fleet 180. The frontend 120 may implement various functionalities to distribute the code module 103, such as selecting the worker manager based on random selection, load, etc. In some instances, the frontend 120 may maintain information identifying a worker manager previously associated with a code module, and distribute the code module to that worker manager. Various additional functionalities that may be implemented by a frontend 120 to distribute calls to a worker manager are described, for example, in U.S. patent application Ser. No. 16/698,829, entitled "SERVERLESS CALL DISTRIBUTION TO UTILIZE RESERVED CAPACITY WITHOUT INHIBITING SCALING," which is hereby incorporated by reference in its entirety. In some embodiments, the worker manager may determine that an appropriate execution environment 302 (e.g., a virtual execution environment or deployment environment such as VM instance 183A or a physical execution environment including one or more physically separated resources) already exists within the worker fleet 180, and may thus execute an instance of the code module within the execution environment 302. In some embodiments, the manager may determine that a new execution environment 302 is required to service the call. Therefore, the worker manager may determine the resources that will be allocated to execute the code module 103. The worker manager may allocate the resources for the execution environment 302 to execute the code module 103. Therefore, the frontend 120 can instruct the worker fleet 180 to execute the code module 103 in an allocated virtual machine instance.

Based on allocating the resources for the execution environment 302, the worker fleet 180, at (4), executes the code module 103 using the execution environment 302. The worker fleet can execute the plurality of code from the code module 103 in the allocated execution environment 103. The execution of the plurality of code may cause modification of state information of components of the allocated execution environment 302. For example, the execution of the plurality of code may modify memory, disks, GPUs, etc. of the allocated execution environment 302. After executing the plurality of code, the worker manager may deallocate (e.g., release) the resources for the execution environment 302. Therefore, the worker fleet 180 executes the code module 103 using an allocated execution environment 302.

To capture the modifications of the state information of the components of the allocated execution environment 302, the snapshot manager 136, at (5), obtains the state information. The snapshot manager 136 may periodically or incrementally obtain state information from the allocated execution environment 302. Further, the snapshot manager 136 may periodically or incrementally obtain the state information while the worker fleet 180 executes the code module 103 using the allocated execution environment 302. For example, the snapshot manager 136 may periodically obtain state information from the allocated execution environment 302. In some embodiments, based on executing the code module, the snapshot manager 136 may obtain the state information from the allocated execution environment 302 prior to the release of the allocated execution environment 302. After the state information is obtained, the allocated execution environment 302 may be released. In some embodiments, the allocated execution environment 302 may not be released.

To store the state information of the components of the allocated execution environment 302, the snapshot manager 136, at (6), generates and stores a snapshot of the state information in a snapshot data store 134. The snapshot manager 136 may generate and store incremental snapshots in the snapshot data store 134. For example, the snapshot manager 136 may generate and store a first snapshot of the state information of the components of the allocated execution environment 302. In some embodiments, the first snapshot may include an indication of the difference between the state information and base state information. In other embodiments, the first snapshot may include an indication of the state information. For a subsequent snapshot, the snapshot manager 136 may receive the updated state information and compare the updated state information with the state information stored in the most recent snapshot (e.g., the first snapshot). Based on this comparison, the snapshot manager 136 can identify the differences between the original state information and the updated state information. The snapshot manager 136 may generate and store a second snapshot of the differences between the original state information and the updated state information. Therefore, the snapshot manager 136 can generate and store the snapshot in the snapshot data store 132.

To identify the state information of the components of the allocated execution environment 302, the snapshot manager 136, at (7), generates and stores a version identifier of the snapshot in a snapshot data store 134. For example, the snapshot manager 136 may generate and store, in the version data store 132, a pointer to the snapshot in the snapshot data store. Further, a plurality of pointers may be made available to a user computing device for selection. For example, a user, via the user computing device, may select a particular pointer (pointing to particular state information) for execution of a set of code) via a user interface that provides information about a plurality of pointers. The snapshot manager 136 can associate each snapshot with a version identifier identifying the version of the snapshot. The snapshot manager 136 may generate and store a plurality of version identifiers in a version data store 132. Each of the version identifiers may be associated with snapshots stored in the snapshot data store 134. Each version identifier may identify a versioned or incremental snapshot generated or modified by the execution of the code module 103. Multiple snapshots and multiple version identifiers may be generated and stored as the code module 103 is executed. The version identifier may identify the code module 103 executed to generate the state information for the snapshot, the allocated execution environment 302, a time of the snapshot, or any other information identifying the snapshot. In some embodiments, the version identifier and the snapshot may be stored in the same data store. In other embodiments, the version identifier and the snapshot may be stored in different data stores. Based on the version identifiers stored in the version data store 132, the snapshot manager may identify particular version identifiers and corresponding snapshots in response to a received stateful information request. Therefore, the snapshot manager 136 may generate and store a version identifier of the snapshot in a snapshot data store 134. In some embodiments, the interactions at (5), (6), and (7) may be carried out iteratively as the code module is executed. Further, the interactions at (5), (6), and (7) may be carried out iteratively as additional code modules are executed.

Figure 4:
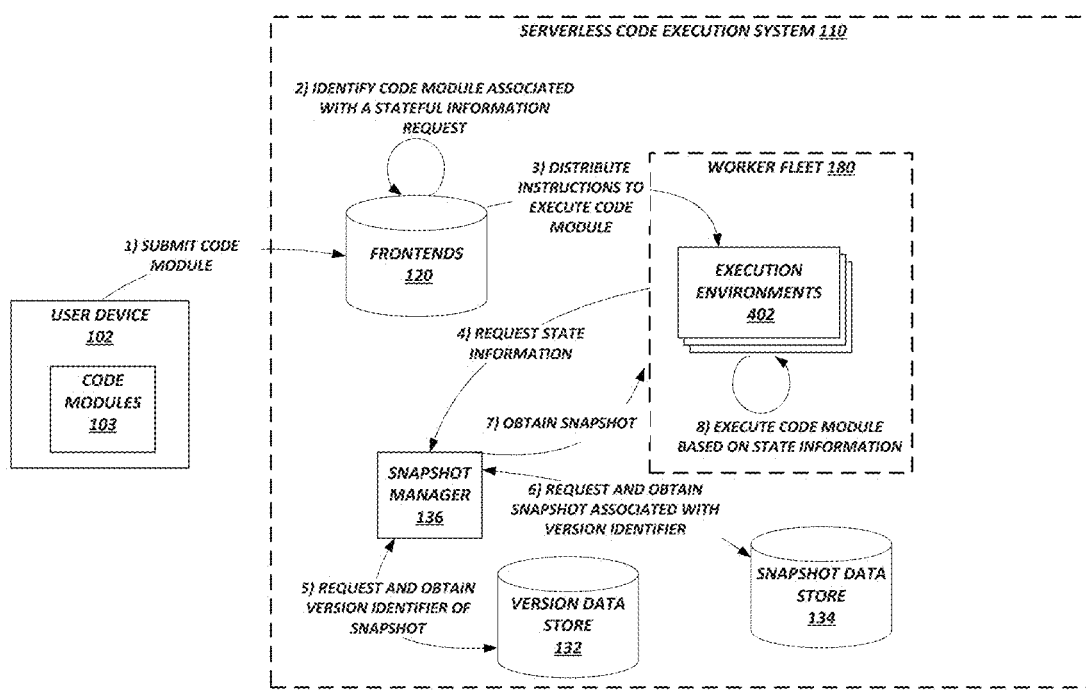
FIG. 4 is a flow diagram depicting illustrative interactions for the executing a code module based on a previously stored snapshot of state information.

To further illustrate how subsequent code modules may invoke the previously stored snapshot of the state information, FIG. 4 depicts illustrative interactions for executing a code module using the serverless code execution system 110, including provisioning a virtual machine instance based on a previously stored snapshot of state information generated by execution of a different code module. The interactions of FIG. 4 may occur, for example, after additional code modules have been provided to the serverless code execution system 110 for execution and after the generation of one or more snapshots of state information modified by the execution of the code modules.

The interactions of FIG. 4 begin at (1), where a user device 102 submits a code module 103 to the frontend 120 to execute the code module. The user device 102 may submit the code module 103 to the frontend 120 as a request or call to the frontend 120 to execute a task (e.g., the task of executing the code module 103). Therefore, the user device 102 may submit a code module 103 to the frontend 120 to execute the code module 103.

To determine how to execute the code module 103, the serverless code execution system 110, at (2), identifies the code module 103 associated with a stateful information request (e.g., a pointer to the state information). The serverless code execution system 110 may identify the code module 103 from the received request from the user device 102. The serverless code execution system 110 may also determine that the request includes a stateful information request (e.g., a request for stateful execution of the code module). Further, the serverless code execution system 110 may identify the stateful information request from the request. The stateful information request may identify a version of state information for execution of the code module. Further, the stateful information request may include an alphabetical, numerical, alphanumerical, symbolical, etc. identifier that identifies the version for the execution of the code module. In some embodiments, the serverless code execution system 110 may provide information identifying the versions of the state information to the user device 102 for selection. In order to identify a version of the state information, the request may include information indicating a time of generation of a particular snapshot, a code module executed to generate the particular snapshot, or any other information identifying the version of the state information or the snapshot. Therefore, the serverless code execution system 110 may identify the code module 103 associated with a stateful information request from the request from the user device 102.

To provide the code module 103 to a particular virtual machine instance, the frontend 120, at (3), distributes instructions to execute the code module 103 based on the stateful information request to the worker fleet 180. In order to distribute the code module to the worker fleet 180, the frontend 120 can distribute the code module 103 to a worker manager of the worker fleet 180. Therefore, the worker manager may determine the resources that will be allocated to execute the code module 103. Further, the worker manager may allocate the resources for the execution environment 302 to execute the code module 103. Therefore, the frontend 120 can instruct the worker fleet 180 to execute the code module 103 in an allocated virtual machine instance.

To determine state information for execution of the code module 103, the worker fleet 180, at (4), requests the state information from the snapshot manager 136. The worker fleet 180 may request the state information based on the frontend 120 identifying that the code module is associated with a stateful information request. The worker fleet 180 may provide the stateful information request or a portion of the stateful information request identifying a particular snapshot or set of state information to the snapshot manager 136. Therefore, the worker fleet 180 can request the state information from the snapshot manager 136.

Based on receiving the request for the state information, the snapshot manager 136, at (5), requests and obtains a version identifier of a snapshot. The snapshot manager 136 may request and obtain the version identifier based on the stateful information request from the version data store 132. For example, the stateful information request may include am identifier of a time period of generation of the snapshot or a particular code module (e.g., code module 123) and based on the identifier, the stateful manager 136 can identify a particular version identifier from the version data store 132. The version identifier of the snapshot may identify a particular snapshot in the snapshot data store. The version identifier may include a first subset of information associated with the stateful information request (e.g., a code module identifier) and a second subset of information associated with the snapshot (e.g., a snapshot identifier). For example, the version identifier may include "Code Module Identifier 123" and "Snapshot Identifier 111." In some embodiments, the version identifier may identify a location of the snapshot. For example, the version identifier may identify a location of the snapshot within the snapshot data store 134. Therefore, the snapshot manager 134 requests and obtain the version identifier of the snapshot. In some embodiments, step (5) may be omitted and the snapshot manager 136 may utilize the version identifier (e.g., the pointer to the state information) to identify the snapshot in the snapshot data store 134.

Based on obtaining the version identifier of the snapshot, the snapshot manager 136, at (6), requests and obtains the snapshot associated with the version identifier. The snapshot manager 136 may request and obtain the snapshot from the snapshot data store 134. The snapshot manager 136 may identify a snapshot associated with the version identifier. For example, the snapshot manager 136 may parse the version identifier to identify the snapshot (or a location of the snapshot) and based on this identification, the snapshot manager 136 can obtain the snapshot from the snapshot data store 134. Therefore, the snapshot manager 136 can request and obtain a snapshot associated with the version identifier.

To enable the execution of the code module based on the state information, the worker fleet 180, at (7), obtains the snapshot of the state information from the snapshot manager 136. In some embodiments, the worker fleet 180 may obtain the state information captured by the snapshot from the snapshot manager 136. Therefore, the worker fleet 180 can obtain the snapshot.

Based on obtaining the snapshot of the state information, the worker fleet 180, at (8), executes the code module 103 using the execution environment 402 based on the state information identified by the snapshot. The worker fleet 180 can execute a plurality of code from the code module 103 in the allocated execution environment 402 based on the state information. The execution of the plurality of code may cause further modification of the state information obtained from the snapshot manager 136. For example, the state information of components of the execution environment may be modified based on execution of the code module. Further, the execution of the code module may modify memory, disks, GPUs, etc. of the allocated execution environment 402. After executing the code module, the worker manager may deallocate (e.g., release) the resources for the execution environment 402 and capture a snapshot of the state information of the components and provide the snapshot to the snapshot manager 136. Therefore, the worker fleet 180 executes the code module 103 using an allocated execution environment 402.

Figure 5:
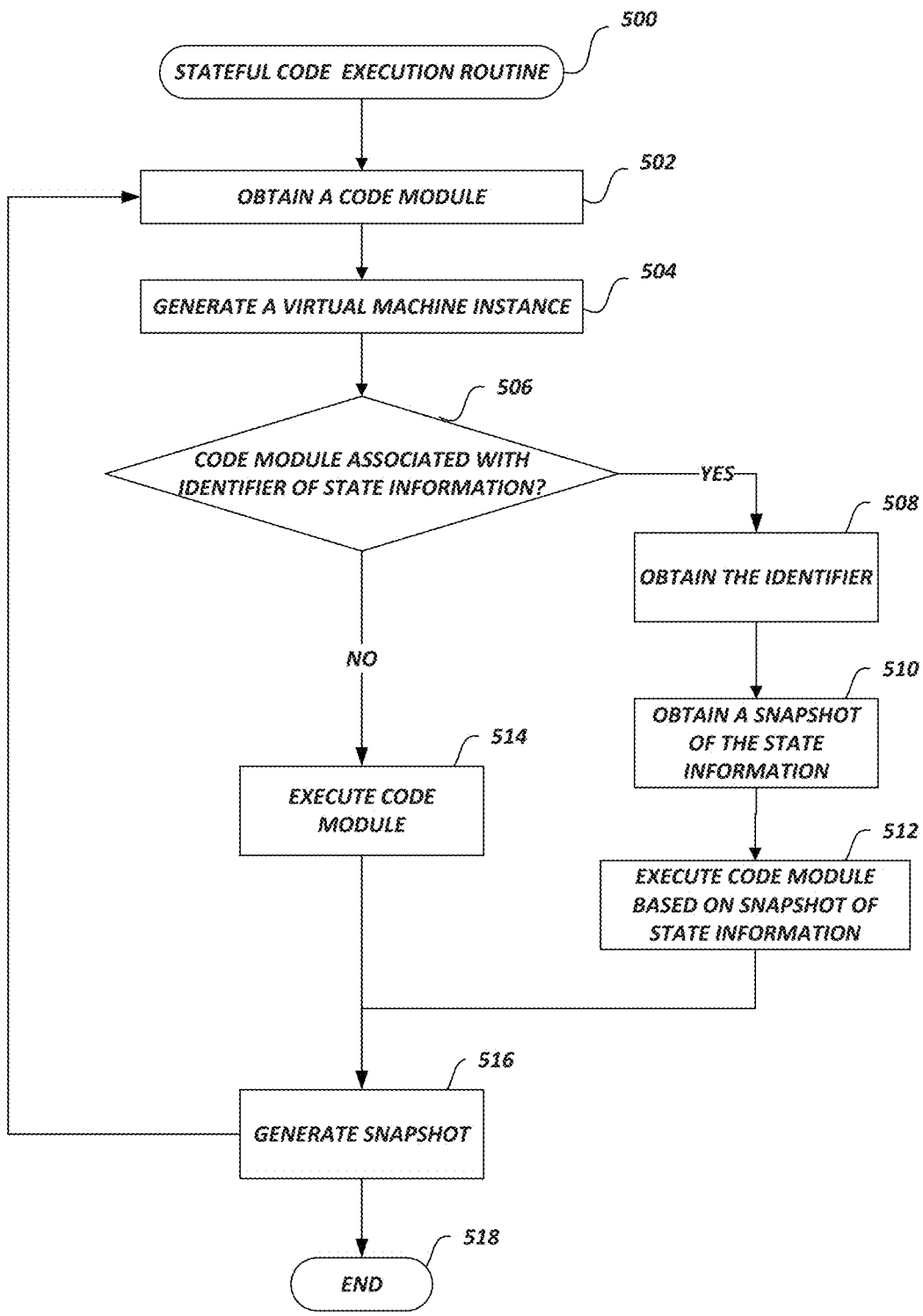
FIG. 5 is a flow chart depicting an illustrative routine for chunk loading of state information for a code module.

With reference to FIG. 5, an illustrative routine 500 will be described for executing a code module. The routine 500 may be implemented for example, by the serverless code execution system 110 of FIG. 1. The routine 500 begins at block 502, the serverless code execution system in communication with a user device obtains a code module. For example, the serverless code execution system may obtain the code module from a plurality of code modules for execution in an execution environment. The plurality of code modules may correspond to a plurality of code cells or a plurality of notebook cells. Further, the request to execute a particular code module can specify particular state information to use for the execution of a set of code of the code module. For example, a user device may specify particular state information to use for the execution of the code module. In some embodiments, a user device may specify a code module and state information (via a state information identifier or a stateful information request) for execution of the code module. In other embodiments, each of the plurality of code modules may include a set of code or a plurality of code and a stateful information request identifying particular state information for the execution of the set of code. For example, the code module may indicate that the set of code corresponds to state information based on a stateful information request or a pointer to particular state information. Therefore, the user device can specify particular state information for the execution of a set of code. Prior to obtaining the code module, the serverless code execution system may generate and store snapshots of state information identifying a state of components of the execution environment. For example, the components may include memory, a disk, a GPU, etc. Further, execution of a preliminary code module may cause modifications to components of the execution environment to generate state information. The user device may identify, via a stateful information request or a state information identifier, particular state information captured by a particular snapshot.

In order to execute the code module, at block 504, the serverless code execution system generates a virtual machine instance. The serverless code execution system may generate the virtual machine instance provisioned with the execution environment. In order to generate the virtual machine instance, the serverless code execution system may provision a set of compute resources for the virtual machine for execution of the set of code. In some embodiments, the serverless code execution system may obtain a snapshot of the state information prior to generating the virtual machine instance. For example, the serverless code execution system may determine that the code module is associated with an identifier of state information, obtain the identifier, obtain a snapshot of the state information, and generate a virtual machine instance based on the snapshot of the state information.

In order to determine how to execute the code module, at decision block 506, the serverless code execution system determines if the code module is associated with an identifier of state information. For example, the identifier of state information may be a stateful information request. In providing the code module, a user device may identify a set of code and request that the set of code be executed based on particular state information. In some embodiments, the user device may identify the set of code and the identifier of state information via the code module. In other embodiments, the user device may identify the set of code and the identifier of state information separately. In order to select the identifier of state information, the serverless code execution system may provide the user device with a plurality of identifiers of state information (e.g., identifiers of state information previously generated by the user, related users, users within a particular group, etc.) and the user device may select an identifier of state information from the plurality of identifiers of state information.

If the code module is associated with an identifier of state information, then at block 508, the serverless code execution system obtains the identifier. For example, the code module may reference particular state information and the serverless code execution system may obtain a pointer to a snapshot of the state information based on the code module. In some embodiments, the serverless code execution system may obtain the identifier from the code module. In other embodiments, the serverless code execution system may determine that the code module is associated with an identifier of state information and separately obtain the identifier from a data store. The identifier may identify a particular version of the state information. For example, the identifier may be a version identifier. In some embodiments, the serverless code execution system may determine if the code module is associated with an identifier of state information by obtaining the identifier of state information from the code module (e.g., block 506 and block 508 may be combined).

Based on obtaining the identifier, at block 510, the serverless code execution system obtains the snapshot of the state information. The serverless code execution system may obtain the snapshot of the state information from a plurality of snapshots of the state information. Each of the plurality of snapshots may identify a modified version of the state information.

Based on identifying the snapshot of the state information, at block 512, the serverless code execution system executes the code module based on the snapshot of the state information. In order to execute the code module, the serverless code execution system may initialize the execution environment on the virtual machine instance for execution of the set of code based on the state information. The state information may identify that a component of the execution environment was modified from a first state to a second state. The execution of the set of code may cause the component of the execution environment to be modified from the second state to a third state. Further, execution of the set of code may cause modification of modified state information to previous state information. For example, the component may be modified from the second state to the first state. Further, execution of the set of code may cause modification of a first version of the modified state information and a second version of the modified state information may not be modified. For example, the state information may be forked. Further, execution of the set of code may cause modification of the modified state information based on modifying the state information to generate the modified state information. For example, the modification to generate the modified state information may be redone. Further, execution of the set of code may cause the merging of a first version of the modified state information and a second version of the modified state information. For example, a previously forked set of state information may be merged together and the state information may be combined. Further, the execution of the set of code may cause the selection and/or modification of a portion of the modified state information. Further, the execution of the set of code may cause a filtering of the modified state information. Further, the serverless code execution system may initialize the execution environment based on the state information. For example, the component of the deployment may be configured based on the state information. Further, the state information may identify a state or status of the memory in the execution environment. Based on this state information, the execution environment may be initialized with the component at this state or status. This can enable state information of components to be maintained between executions of code modules.

If the code module is not associated with the identifier of the state information, then at decision block 514, the serverless code execution system executes the code module. The execution of the code modules (with or without the state information) may cause the generation of additional state information. Further, based on executing the code module, the serverless code execution system may incrementally snapshot the component of the execution environment to capture a state of the component. In some embodiments, the component may be a volatile or durable memory of the execution environment and the state information may identify a volatile or durable in-memory state of the execution environment. In some embodiments, based on executing the set of code, the serverless code execution system may release the set of compute resources for the virtual machine. The serverless code execution system may release the set of compute resources prior to execution of a subsequent set of code.

Based on execution of the code module, at block 516, the serverless code execution system generates the snapshot. The serverless code execution system may generate the snapshot based on the execution of the code module. Further, the serverless code execution system may generate a version identifier to identify the snapshot. The serverless code execution system can store the version identifier and/or the snapshot. Further, the serverless code execution system can provide the version identifier and/or the snapshot to a user device. In some embodiments, the serverless code execution system can provide (e.g., cause display of) a plurality of version identifiers and/or snapshots for a user device (e.g., all snapshots associated with a user device, all snapshots associated with a user organization, all snapshots associated with a user role, etc.). Thus, the user device may access a plurality of version identifiers and/or snapshots and select a particular version identifier and/or snapshot for use in the execution of a subsequent set of code. Therefore, the serverless code execution system can enable a user to access snapshots of previous state information in order to select particular state information for the execution of an unrelated set of code (e.g., a set of code that did not generate the state information). In some embodiments, the routine 500 may repeat any number of times. For example, the serverless code execution system may obtain a code module that references a snapshot previously generated at block 516. The routine 500 then ends at block 518.

In various embodiments, the stateful execution routine 500 may include more, fewer, different, or different combinations of blocks than those depicted in FIG. 5. For example, the routine 500 may, in some embodiments, output an identifier identifying whether the code is associated with an identifier of state information. As a further example, in embodiments where the entire code corresponds to a transaction, block 414 may be omitted and the routine 400 may end after the transaction completes successfully. As a further example, blocks 508 and 510 may be combined, and the routine 500 may obtain the snapshot without separately identifying the identifier of the state information. The routine 500 depicted in FIG. 5 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
    a non-transitory data store configured to store computer-executable instructions; and
    a computing device in communication with the non-transitory data store, wherein the computer-executable instructions, when executed by the computing device, configure the computing device to:
        receive a first input indicating a first set of code for execution in an execution environment;
        generate a first virtual machine instance provisioned with the execution environment;
        initialize the execution environment on the first virtual machine instance;
        execute the first set of code in the execution environment initialized on the first virtual machine instance, wherein execution of the first set of code causes a first modification to a state of one or more provisioned resources in the execution environment from a first state to a second state;
        generate a snapshot of the state of the one or more provisioned resources as modified based on the first modification;
        store the snapshot of the state of the one or more provisioned resources as modified based on the first modification;
        receive a second input indicating 1) a second set of code, 2) an identifier of the state of the one or more provisioned resources as modified based on the first modification, and 3) a request to execute the second set of code using the state of the one or more provisioned resources as modified based on the first modification, wherein the first set of code is at least partially different from the second set of code;
        generate a second virtual machine instance provisioned with the execution environment, wherein the state of the one or more provisioned resources as modified based on the first modification is associated with the snapshot of the state of the one or more provisioned resources as modified based on the first modification;
        initialize the execution environment on the second virtual machine instance based on the state of the one or more provisioned resources associated with the snapshot of the state of the one or more provisioned resources as modified based on the first modification; and
        execute the second set of code in the execution environment initialized on the second virtual machine instance based on the state of the one or more provisioned resources as modified based on the first modification, wherein execution of the second set of code causes a second modification of the state of the one or more provisioned resources from the second state to a third state.

2. The system of claim 1, wherein the computer-executable instructions, when executed by the computing device, further configure the computing device to:
    provision one or more resources in the execution environment for execution of the first set of code; and
    release the one or more resources prior to execution of the second set of code.

3. The system of claim 1, wherein the snapshot of the state of the one or more provisioned resources as modified based on the first modification is one of a plurality of snapshots, each of the plurality of snapshots associated with a respective identifier of a respective state of the one or more provisioned resources.

4. The system of claim 1, wherein the one or more provisioned resources comprise volatile memory of the execution environment, wherein the computer-executable instructions, when executed by the computing device, further configure the computing device to:
    incrementally snapshot the volatile memory.

5. The system of claim 1, wherein the computer-executable instructions, when executed by the computing device, further configure the computing device to:
    based on the execution of the second set of code, snapshot the state of the one or more provisioned resources prior to release of the second virtual machine instance.

6. A computer-implemented method comprising:
    receiving an input indicating 1) a set of code, 2) an identifier of modified state information, and 3) a request to execute the set of code using the modified state information, the modified state information indicative of a modification of a state of one or more provisioned resources in an execution environment from a first state to a second state based on an executed preliminary set of code, wherein the set of code is at least partially different from the executed preliminary set of code and the identifier of the modified state information is associated with a snapshot of the modified state information;
    generating a virtual machine instance provisioned with the execution environment, wherein the modified state information is associated with the snapshot of the modified state information;
    initializing the execution environment on the virtual machine instance based on the modified state information that is associated with the snapshot of the modified state information; and
    executing the set of code in the execution environment initialized on the virtual machine instance based on the modified state information, wherein execution of the set of code causes further modification of the state of the one or more provisioned resources from the second state to a third state.

7. The computer-implemented method of claim 6, wherein the set of code corresponds to one or more code cells, one or more notebook cells, one or more code classes, one or more code functions, one or more chunks of code, one or more code languages, or one or more code identifiers.

8. The computer-implemented method of claim 6, wherein the one or more provisioned resources comprise a memory, a disk, or a graphical processing unit.

9. The computer-implemented method of claim 6, wherein the set of code comprises a first set of code, the computer-implemented method further comprising:
provisioning one or more resources for the virtual machine instance for execution of the first set of code; and
releasing the one or more resources prior to execution of a second set of code.

10. The computer-implemented method of claim 6, wherein the snapshot of the modified state information is one of a plurality of snapshots, each of the plurality of snapshots associated with a respective identifier of respective modified state information.

11. The computer-implemented method of claim 6, wherein the snapshot of the modified state information comprises a first snapshot, wherein the execution of the set of code causes generation of additional state information; the computer-implemented method further comprising:
generating a second snapshot of the additional state information.

12. The computer-implemented method of claim 6, further comprising:
incrementally snapshotting state information generated based on execution of one or more sets of code.

13. The computer-implemented method of claim 6, wherein the snapshot of the modified state information comprises a first snapshot, the computer-implemented method further comprising:
generating a second snapshot of additional state information based on the execution of the set of code; and
storing the second snapshot with an identifier of the additional state information, wherein the first snapshot is stored with the identifier of the modified state information.

14. The computer-implemented method of claim 6, wherein the set of code comprises a first set of code, wherein the snapshot comprises a first snapshot, wherein the identifier of the modified state information comprises a first identifier, wherein the input comprises a first input, the computer-implemented method further comprising:
generating a second snapshot of additional state information based on execution of the first set of code;
storing the second snapshot; and
receiving a second input indicating a second set of code and one or more of the first identifier or an identifier of the additional state information.

15. The computer-implemented method of claim 6, wherein the modified state information comprises a first version of the modified state information and a second version of the modified state information.

16. The computer-implemented method of claim 6, further comprising, based on the execution of the set of code:
modifying the modified state information to generate state information;
modifying a first version of the modified state information, wherein a second version of the modified state information is not modified;
modifying the modified state information based on modifying state information to generate the modified state information;
modifying a portion of the modified state information;
merging a first version of the modified state information and a second version of the modified state information.

17. The computer-implemented method of claim 6, wherein the one or more provisioned resources comprise a durable memory of the execution environment, wherein the state of the one or more provisioned resources indicates a durable in-memory state of the execution environment.

18. The computer-implemented method of claim 6, wherein the first state is different as compared to the third state.

19. The computer-implemented method of claim 6, wherein a first portion of the modified state information is loaded into the execution environment for the execution of the set of code, and one or more second portions of the modified state information are loaded, on-demand, into the execution environment for the execution of the set of code, wherein the execution of the set of code is initiated prior to loading of the one or more second portions of the modified state information.

20. Non-transitory computer-readable media including computer-executable instructions that, when executed by a processor, cause the processor to:
receive an input indicating 1) a first set of code, 2) an identifier of modified state information, and 3) a request to execute the first set of code using the modified state information, the modified state information indicative of a modification of a state of one or more provisioned resources in an execution environment from a first state to a second state based on an executed second set of code, wherein the first set of code is at least partially different from the executed second set of code;
generate a virtual machine instance provisioned with the execution environment;
retrieve the modified state information using the identifier of the modified state information;
initialize the execution environment on the virtual machine instance based on the retrieved modified state information; and
execute the first set of code in the execution environment initialized on the virtual machine instance based on the retrieved modified state information, wherein execution of the first set of code causes further modification of the state of the one or more provisioned resources in the execution environment of the virtual machine instance from the second state to a third state.

21. The non-transitory computer-readable media of claim 20, wherein the computer-executable instructions, when executed by the processor, cause the processor to:
based on the execution of the first set of code, snapshot the state of the one or more provisioned resources prior to release of the virtual machine instance.

22. The non-transitory computer-readable media of claim 20, wherein the computer-executable instructions, when executed by the processor, cause the processor to:
incrementally snapshot the state of the one or more provisioned resources.

\* \* \* \* \*